(No Model.)
J. D. R. LAMSON.
HYDROSTATIC MEASURING VESSEL.
No. 577,434. Patented Feb. 23, 1897.
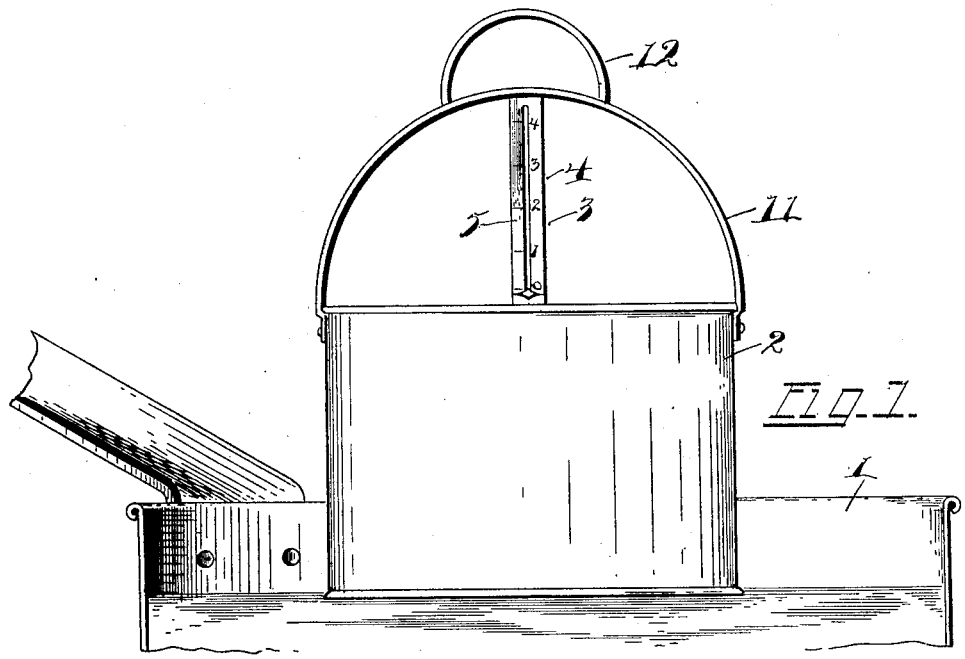
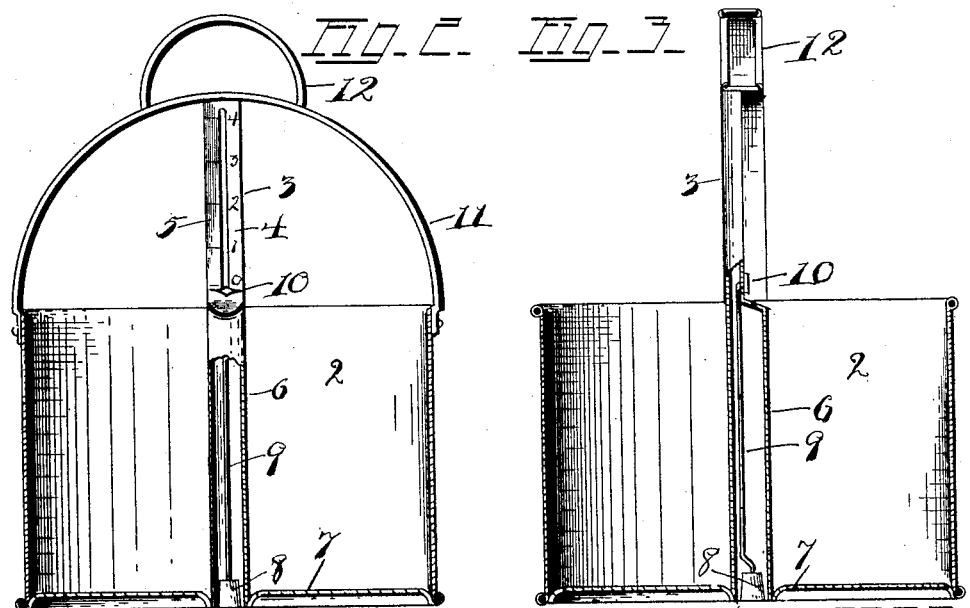
WITNESSES
Carl H. Keller
Carroll J. Webster
INVENTOR
John D R Lamson
By William Webster
Atty

UNITED STATES PATENT OFFICE.

JOHN D. R. LAMSON, OF TOLEDO, OHIO.

HYDROSTATIC MEASURING VESSEL.

SPECIFICATION forming part of Letters Patent No. 577,434, dated February 23, 1897.

Application filed September 8, 1896. Serial No. 605,119. (No model.)

*To all whom it may concern:*

Be it known that I, JOHN D. R. LAMSON, of Toledo, county of Lucas, and State of Ohio, have invented certain new and useful Improvements in Hydrostatic Measuring Vessels; and I do hereby declare that the following is a full, clear, and exact description of the invention, which will enable others skilled in the art to which it appertains to make and use the same, reference being had to the accompanying drawings, and to the figures of reference marked thereon, which form part of this specification.

My invention relates to a hydrostatic measuring vessel, and has for its object to utilize the displacement of a liquid in the indication of a quantity of matter to be weighed or measured.

A further object is to provide a measuring vessel adaptable to a liquid-pressure due to displacement of the liquid, whereby the weight or quantity shall be indicated upon a scale movable with the vessel and registerable with relation to the indicator, whereby the weight or quantity contained in the vessel shall be indicated upon the scale or scales pertinent thereto.

The invention therefore consists in a measuring vessel having a central walled opening extending substantially the height of the vessel, a float contained within the chamber formed by the wall of the opening, a pointer carried by the float, and a scale-standard carried by the vessel and extending above the same.

The invention further consists in the parts as hereinafter shown, described, and claimed.

In the drawings, Figure 1 is an elevation of one form of scale constructed in accordance with my invention, showing a tank in section for containing the liquid into which the measure is seated after the introduction of the matter to be weighed. Fig. 2 is a vertical section of the receptacle, showing the scale in front view, with a portion of the indicator-tube broken away to disclose the float and indicator-rod. Fig. 3 is a like view, in side elevation, of the scale.

1 designates a vessel containing a liquid, and 2 a cylindrical vessel for receiving the matter to be weighed. The vessel 2 is provided with a vertical scale-standard 3, upon one side 4 of which may be indicated pounds, ounces, &c., of dry measure, and upon the opposite side 5 may be a scale indicating liquid measure.

The vessel 2 is provided with a central tube 6, extending the entire height of the same and opening through the bottom 7, having arranged therein a float 8, connected with a rod 9, having an indicator-pointer 10 upon the upper end coincident with the scale-standard 3.

For convenience the vessel 2 is provided with a handle 11, extending diametrically across the vessel and in a semicircular elevation therefrom, to which the scale-standard is secured, and in addition thereto there may be a like semicircular bail or handle 12 surrounding the same.

In operation the matter to be weighed is placed in the vessel 2 and the vessel is inserted into the liquid in the pan 1, when the weight of the matter in the vessel displacing the liquid in the vessel 1 raises the float 8 accordingly and causes the indicator or pointer 10 to register upon the scale-standard either the dry or liquid measure indicated thereon.

It will be seen that by reason of the central location of the float 8 there is always insured a correct registration upon the scale-standard the amount of displacement of water occasioned by the weight of the matter contained in the vessel.

While I have shown a specific form of construction of the weighing vessel and also of the scale-beam and indicator, I wish it distinctly understood that I may vary this construction greatly without departing from the spirit of my invention.

I regard the central location of the float in connection with the circularity of the vessel or receptacle of the matter to be weighed as of essential importance, as by this arrangement any unevenness of dry matter to be weighed or measured in its relation to the vessel is compensated for in the displacement of the liquid by the central location of the float. I may, however, in some forms of measuring vessels where the objection of an overweight upon a particular portion of the bottom of the vessel is not likely to occur provide the scale in a housing on one side of the vessel. This construction would be practical for the measurement of liquids alone, where an overweight would not occur upon either side of the vessel, but for practical purposes I prefer to arrange the vessel as shown.

It will be evident that I may so modify the essential height of my invention as to arrange a permanent pointer and a scale-beam movably with the float.

What I claim is—

In a hydrostatic measuring vessel, a vessel to receive the matter to be weighed, having a central walled opening extending substantially the height of the vessel forming a central chamber extending vertically through the vessel and insulated from the interior thereof, a float located in the chamber, a rod secured at one end to the float, the opposite end carrying a pointer, and a scale-standard permanently carried by the vessel, arranged in vertical alinement with the pointer.

In testimony that I claim the foregoing as my own I hereby affix my signature in presence of two witnesses.

JOHN D. R. LAMSON.

Witnesses:
WILLIAM WEBSTER,
CARL H. KELLER.